United States Patent
Polman et al.

(10) Patent No.: US 6,305,624 B1
(45) Date of Patent: Oct. 23, 2001

(54) FACILITY FOR RECYCLING THE COMPONENTS OF DEFECTIVE OR USED FLUORESCENT TUBES

(75) Inventors: Eckhard Polman, Voerde; Christian Bonmann, Essen, both of (DE)

(73) Assignee: LVG Leuchtstofflampen Verwertungs Gesellschaft mbH, Essen (DE)

( * ) Notice: Subject to any disclaimer, the term of this patent is extended or adjusted under 35 U.S.C. 154(b) by 0 days.

(21) Appl. No.: 09/446,011

(22) PCT Filed: Jun. 15, 1998

(86) PCT No.: PCT/DE98/01613

§ 371 Date: Feb. 11, 2000

§ 102(e) Date: Feb. 11, 2000

(87) PCT Pub. No.: WO98/58742

PCT Pub. Date: Dec. 30, 1998

(30) Foreign Application Priority Data

Jun. 19, 1997 (DE) .......................... 297 10 775 U

(51) Int. Cl.[7] .................................................. B02C 19/14
(52) U.S. Cl. .............................................. 241/99; 241/301
(58) Field of Search .................................. 241/99, 101.4, 241/81, 1, 301

(56) References Cited

FOREIGN PATENT DOCUMENTS

| | | |
|---|---|---|
| 395 078 | 9/1992 | (AT) . |
| 36 10 355 | 10/1987 | (DE) . |
| 36 18 434 | 1/1988 | (DE) . |
| 39 11 395 | 5/1990 | (DE) . |
| 39 09 380 | 9/1990 | (DE) . |
| 40 30 732 | 12/1991 | (DE) . |
| 41 31 974 | 4/1993 | (DE) . |
| 44 05 398 | 4/1995 | (DE) . |
| 44 43 234 | 6/1995 | (DE) . |
| 44 01 351 | 7/1995 | (DE) . |
| 44 29 326 | 12/1995 | (DE) . |
| 195 33 142 | 12/1996 | (DE) . |
| 195 33 143 | 12/1996 | (DE) . |
| 0 157 249 | 10/1985 | (EP) . |
| 0 638 373 | 2/1995 | (EP) . |

*Primary Examiner*—Mark Rosenbaum
(74) *Attorney, Agent, or Firm*—Foley & Lardner

(57) ABSTRACT

A system (100) for recycling the components of defective or spent fluorescent tubes (3) comprises a conveying device (15), on which the fluorescent tubes (3), which are arranged parallel to each other, adjacent to each other and perpendicular to the conveying device, can be conveyed past processing stations (22, 28, 36, 38, 40) in a substantially horizontal manner. There is a feed station (5) for feeding the delivered fluorescent tubes (3) to the conveying device (15). The processing stations comprise a perforating station (22), where a hole in the glass tube (30) can be produced at least on one end of the fluorescent tubes (3) for the purpose of relieving the negative pressure prevailing in the glass tube; comprise a severing station (36) for severing the sealing and connecting caps (32) from the glass tube (30) of the respective fluorescent tube (3); comprise a blow-out station (38), where the phosphor (31) is blown out of the respective glass tube (30) by means of a blast of air along the length of said tube, and comprise a breaking station (40), where the glass tube (30) can be comminuted into free-flowing fragments. The conveying device (10) can be driven continuously; and the perforating station (22) has on at least one end and the severing station has on both ends of the respective fluorescent tubes (3) burner strips (23) with adjacent nozzle orifices (26), which are arranged close together in a row arranged in a straight line in the conveying direction and which melt the ends of the glass tube (30) into the shape of a slit. (FIG. 1).

18 Claims, 3 Drawing Sheets

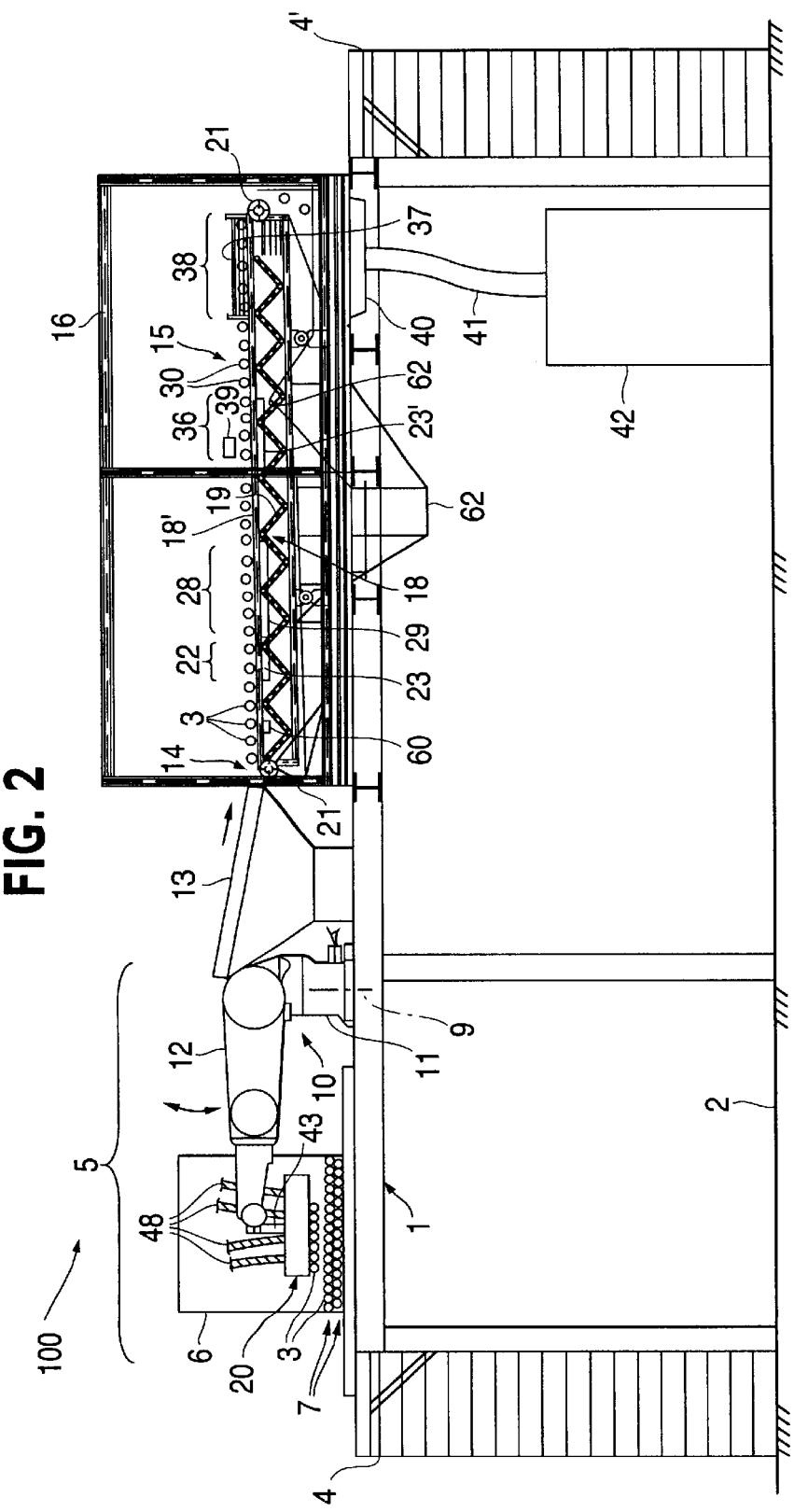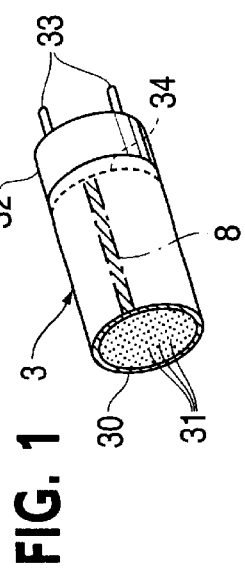

FACILITY FOR RECYCLING THE COMPONENTS OF DEFECTIVE OR USED FLUORESCENT TUBES

BACKGROUND OF THE INVENTION

The invention relates to a system for recycling for the purpose of re-utilizing the components of defective or spent fluorescent tubes.

For lighting purposes in offices, in public areas, workshop halls etc., one usually uses fluorescent lamps that are made of a straight glass tube, whose inside circumference is coated with a fine luminescent powder and whose interior is filled with a low pressure gas. This type of tubular fluorescent lamp is called a fluorescent tube. The ends of the glass tube are sealed and provided with a metal connecting base, which bears contact pins. These universal fluorescent tubes have only a limited life and, therefore, rapidly fall into a defective or spent state. Their components, namely the glass tube, the connecting base and the content material, namely phosphors and mercury, are largely recyclable. For this reason the fluorescent tubes are collected for recycling the components on pallets with suitable superstructures, on which the tubes are deposited in ordered layers.

To recycle the components of these fluorescent tubes there exists a system that comprises a raised longitudinal stage, on whose one end the pallets with the fluorescent tubes can be deposited. Attached to the pallet region in the longitudinal direction is an essentially closed housing, which has a lift beam conveyor, which conveys the fluorescent tubes step-by-step forward, moving them past several processing stations in the housing.

In the feed station the fluorescent tubes are fed manually to a short chain conveyor, where at one end of the conveyor the fluorescent tubes are transferred to the lift beam conveyor.

The processing stations in the housing comprise, first of all, a perforating station, in which stationary oxyhydrogen burners direct a very concentrated thin flame on the glass tube in the vicinity of the respective cap and burn a small hole in the glass tube. The air can flow through this small hole into the fluorescent tube in order to produce a pressure equilibrium.

Then the fluorescent tubes are carried past a severing station, where the fluorescent tubes are turned and the glass tube in the vicinity of the respective cap is severed, i.e. cracked off, using another burner.

Next is a blow-out station, in which a strong blast of air is sent from one side through the glass tube, which has been freed of its caps. The air blows out the bulk of the fine luminescent powder adhering to the inside circumference of the glass tube through the other end of the glass tube.

Finally the cleaned glass tube is comminuted into small free-flowing fragments or splinters.

The caps, the glass and optionally the content materials are collected and fed to recycling. When the recycling of the content material cannot be justified from an economic view point, dumping, e.g. underground landfill, may also be considered.

The existing system has functioned for years satisfactorily, but its efficiency is limited. Namely the single fluorescent tube must remain in the perforating station and in the severing station until the burner has created the hole. This intermittent method is time-consuming.

SUMMARY OF THE INVENTION

The invention is based on the problem of providing a system of this type that is more efficient.

The problem is solved by the present invention.

In contrast to the lift beam conveyor, a continuously working conveyor in combination with the burner strips, which extend a certain distance in the conveying direction, instead of the stationary point flame in the perforating station and in the severing station greatly multiples the system's productivity. Tests have demonstrated that a single system can process 11,000 fluorescent tubes per hour.

In one preferred embodiment of the invention, the conveying device comprises two chain conveyors, which revolve continuously side-by-side in vertical planes and are spaced apart so as to match the length of the commercial fluorescent tubes and whose upper runs carry the fluorescent tubes.

To decouple the work in the processing stations from the fluorescent tube feed, it is advisable to connect to the conveying device a transfer conveyor, onto which the fluorescent tubes can be fed in an ordered manner and by means of which the fluorescent tubes can be delivered individually to the conveying device.

The transfer device can comprise a conveyor, followed by a separating unit.

In order to eliminate the manual feed of the fluorescent tubes in the feed station and the accompanying risk to this person performing the task should one of the fluorescent tubes break, the feed station can comprise a grasping device, by means of which at least one portion of a layer of fluorescent tubes can be grasped at one time and put on the transfer conveyor.

The grasping device can comprise a suction member, which can raise through the suction effect the relatively light fluorescent tubes out of the layer and release them again by way of the transfer conveying device.

The suction member can comprise in particular a suction frame, which is adapted to the layout of the layer or a portion of the layer of fluorescent tubes. The suction frame can be suspended from a lifting device, which is provided with a boom that can be swung up or down and rotated around a vertical axis.

The severing station can comprise a burner strip which extends in the conveying direction at both ends of the fluorescent tubes.

The burner strip, which is used both in the perforating station and in the severing station, can exhibit an effective length ranging from 100 to 300 mm and a longitudinal housing with thirty to eighty nozzle orifices, whose diameters range from 0.2 to 0.4 mm and which are provided, when in operation, on a side facing the fluorescent tubes.

A small number of all of the fluorescent tubes under discussion are provided for use in environments subjected to the risk of explosion and bear metal strips, normally copper strips, which run parallel to the axis over the entire length of the outside of the glass tube, in order to avoid sparks. The copper may not get into the recycled comminuted glass, because it causes a discoloration of the glass during the remelting process.

For this reason such special fluorescent tubes must be excluded from the recycling process.

This occurs with the aid of the detector, which interacts with a suitable separating unit, by means of which the fluorescent tubes, provided with copper strips, can be excluded from the recycling so that the copper cannot get into the recycled glass. The detector can work, for example, optically by detecting the reflection differences when the copper strip on the rotating fluorescent tube passes.

Important embodiments of the invention include features permitting the detection of fluorescent tubes, filled with different phosphors, and a sorting by the type of phosphor that is blown out. A device to detect different fluorescent tubes by their different types of luminescent powder is known, for example, from the WO 98/04904.

BRIEF DESCRIPTION OF THE DRAWINGS

One embodiment of the invention is depicted as a schematic drawing.

FIG. 1 depicts the severed right end of a fluorescent tube.

FIG. 2 is a side view of the system, according to the invention.

DESCRIPTION OF THE PREFERRED EMBODIMENTS

Figure 3:
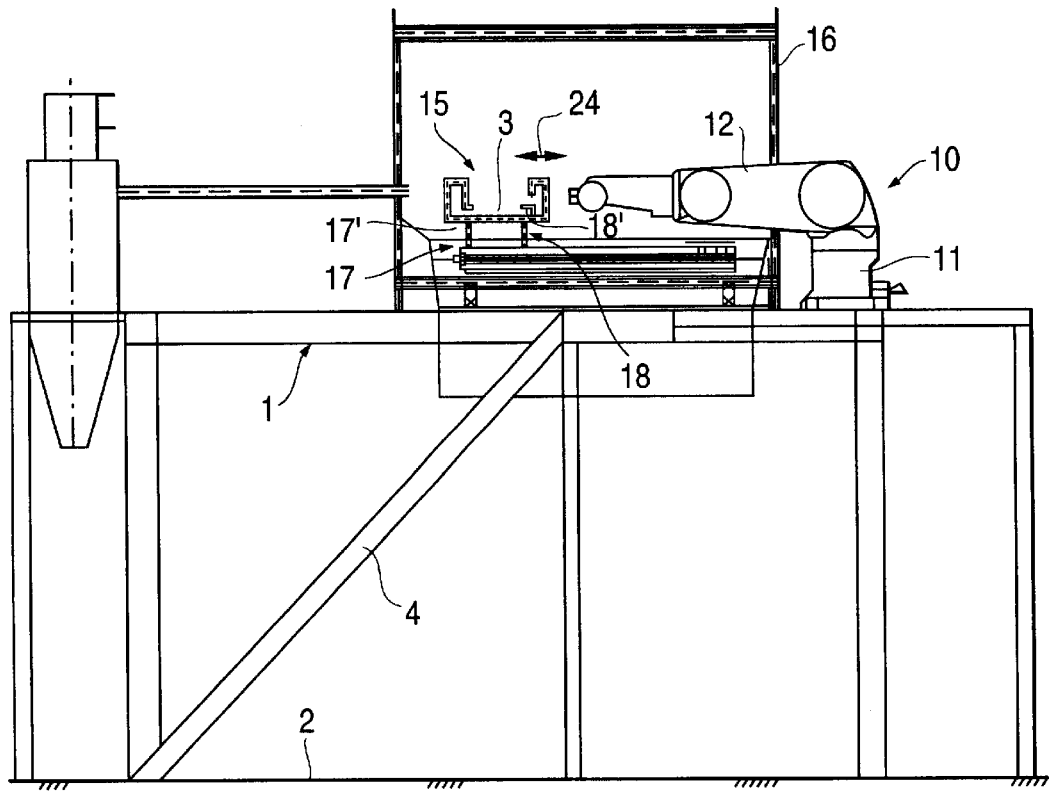
FIG. 3 is a view of the system, according to FIG. 2, from the left.

FIG. 1 shows the severed right end of a fluorescent tube 3. The fluorescent tube 3 comprises a glass tube 30, which is 50 to 180 cm long and has a diameter ranging from 2 to 4 cm. The glass tube interior has a coat of fine luminescent powder, which adheres to the inside wall of the glass tube 30 and is shown in FIG. 1 with dots 31. Both ends of the fluorescent tube are sealed by a melted-on stem, which is made of lead glass and bears the lead wires and the filament. On the outside a metal connecting base 32, which exhibits the contact pins 33 for the electrical connection, is cemented to both ends of the fluorescent tube. The glass tube 30 is evacuated, with the result that applying current to the contact pins 33 will produce a gas discharge, which causes the mercury-containing phosphor 31 to glow. 34 marks the severing point, at which the end of the fluorescent tube with the connecting base 32 is severed in the recycling system to be described below. The outer circumference of explosion-protected fluorescent tubes 3 exhibits a copper strip 8, which can be detected by a device (to be described below) for the purpose of sorting out such fluorescent tubes 3.

The recycling system, all of which is marked with the reference numeral 100 in FIG. 2, is arranged on a stage 1, which is provided at a height of about 2 to 3 m above the ground 2 and has the purpose of providing space under the actual system 100 for classifying and setting up containers for the recycled components of the fluorescent tubes 3. One must use ladders 4, 4' to climb to the stage 1.

The left side of the stage 1, depicted in FIG. 2, has a feed station, all of which is marked with the reference numeral 5. The defective or spent fluorescent tubes 3 are delivered on pallets with their own superstructure, which are indicated by the triangle 6 in FIG. 2 and can be deposited on the stage 1 by a lifter. The fluorescent tubes 3 are stacked side-by-side on the pallets 6 in ordered horizontal layers 7 so as to form a dense package. Next to the region, on which the pallets 6 are deposited, there is a lifting device 10, which comprises a column 11, on which a boom 12 can be rotated around a vertical axis 9. In addition, the boom 12 can be swung up and down in the direction of the arrow. Suspended from the free end of the boom 12 is a suction frame, all of which is marked 20 and which is connected by means of vacuum lines 48 to a vacuum pump or other device to generate a vacuum.

The suction frame 20 is lowered from the top onto a layer 7 of fluorescent tubes 3 and grasps them when the vacuum is switched on. In the embodiment illustrated in FIG. 1, the suction frame 20 grasps only one portion of a layer 7, namely seven fluorescent tubes, which do not have to cover the entire stretch of the suction frame 20. Hence the suction frame 20 can also lift a few fluorescent tubes lying side-by-side.

The suction frame 20 is moved from the position, shown in FIG. 2, by way of a transfer conveyor 13, onto which the fluorescent tubes 3 are deposited and can be conveyed in the direction of the arrow by means of a suitable conveyor, e.g. by means of a chain conveyor. At the end of the conveyor's route there is at 14 a separating unit, by means of which the fluorescent tubes 3 are deposited at specified intervals on a conveyor 15, which will be described in detail below. The conveying device 15 is encompassed by a housing 16, which is provided with sealed walls due to the risk of splinters should a fluorescent tube 3 break. The walls have windows, which make it possible to watch the work being performed in the housing 16. The housing 16 is under a slight negative pressure so that no mercury vapor can escape into the environment.

The housing 16 has two chain conveyors 17, 18, which run parallel to each other and whose chains revolve over deflecting rollers 21 or 21', which are arranged at the beginning and at the end of each respective channel 19. The upper runs 17', 18' of the chain conveyors 17, 18 carry fluorescent tubes 3, which are arranged perpendicular to their conveying direction and maintain a specified distance from each other, as evident from FIG. 3. FIG. 3 does not exhibit the suction frame 20 at the boom 12 for the sake of clarity. The conveying direction runs vertically to the drawing plane of FIG. 3.

It is evident from the embodiment in FIG. 3 that the conveying device 15 can be adjusted for relatively short fluorescent tubes 3. Thus the chain conveyors 17, 18 are arranged perpendicular to the conveying direction and rather close together. However, the chain conveyor 18 can be set in the direction of the arrow 24 perpendicular to the conveying direction in order to adjust the recycling system 100 to the different lengths of the fluorescent tubes 3.

Figure 4:
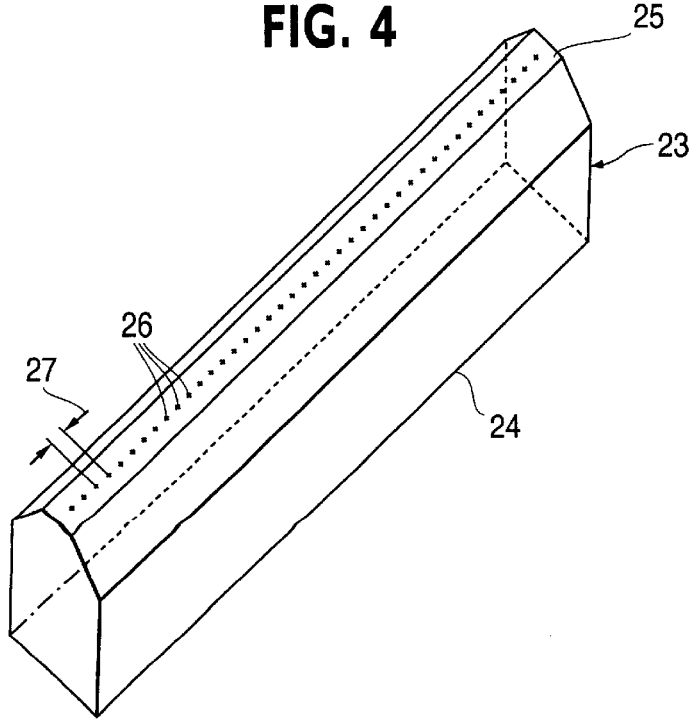
FIG. 4 is a perspective view of a burner strip.

The fluorescent tubes 3 are carried along by the conveying device 15 to several processing stations, as evident from FIG. 2. The first processing station is a selecting unit 60, which acts on one end of the fluorescent tubes 3 and which comprises an excitation source for exciting the phosphor coating 31 of the fluorescent tubes 3 and a spectroscopic detecting agent for detecting the light emitted by the phosphor coating 31. The fluorescent tube 3 is categorized into several, for example, three groups using the emission spectrum. The content materials of the tubes, in particular the phosphors, are collected separately. The next station is a perforating station 22, whose one end approx. 200 mm from the connecting base 32 of the fluorescent tubes 3 comprises a burner strip 23, which extends parallel to the conveying direction of the conveyor device 15 and of which one embodiment is depicted as a schematic drawing in FIG. 4. The burner strip 23 comprises a longitudinal housing 24 with a narrow side face 25, which tapers off into the shape of a roof and in which a plurality of nozzle orifices 26, (in the embodiment there are 41 nozzle orifices), in the shape of fine boreholes with 0.3 mm diameter are spaced apart at short intervals 27, forming a straight row. The burner strip 23 is charged with oxyhydrogen gas and produces on the whole a blade-like flame of a very high temperature that melts the glass at one point on the ends of the glass tube, which does not rotate as it passes the burner strip 23. Since the burner strip 23 extends in the conveying direction, there is adequate time for the glass to melt at one point and for the air to flow into the evacuated interior of the fluorescent tubes and thus to generate the pressure equilibrium, as the fluorescent tubes 3 move forward in continuous motion.

After the perforating station 22 there is a relief station 28 with an oblong burner 29, which is arranged in the conveying direction at one end of the fluorescent tubes 3. Said burner is in the region where the burner strip 23 of the perforating station 22 acts on the tubes; that is, approx. 200 mm from the end of the respective fluorescent tubes 3. Said burner, which can be operated with natural gas and compressed air, maintains the temperature at the ends of the glass tube 30 in order to avoid breakage due to stress.

In the severing station 36 there are other burner strips 23' at both ends of the fluorescent tubes 3. In this station the fluorescent tubes 3 are rotated by a device (not illustrated), comprising a continuously revolving belt, which engages at the periphery of the fluorescent tubes 3. The tubes come to rest on a ramp (not illustrated) so that, when passing the burner strip 23' of the severing station 36, the glass tube 30 is heated in a narrow zone around and along the line 34 (FIG. 1) in the immediate vicinity of the stopper and connecting cap 32. Following the burner strip 23' of the severing station 32, there is a cooling section 62, a so-called cold knife, where a cold knife-like air jet is aimed at the pre-heated narrow zone, thus blasting off the respective glass tube 30 along the line 34 (FIG. 1). The blasted-off ends are caught with the connecting bases and collected for recycling.

The detector 39, provided above the region of the burner strip 23', where the fluorescent tube 3 is rotating, detects fluorescent tubes with a copper strip 8 (FIG. 1), which are removed from the process, for example broken, by a separating unit (not illustrated) and conveyed into the hopper 62.

The glass tube 30, which is freed at this point of the sealing and connecting caps 32, passes then into the blow-out station 38, where it is held by a hold-down 37 on the chain conveyors 17, 18. This process is necessary because in the blow-out station 38 a strong blast of air blows the phosphor 31 (FIG. 1) from one end to the other end of the glass tube 30. The air is directed through each glass tube 30 by means of a blast nozzle. The phosphor is separated from the air stream in a cyclone (not illustrated) and fed to a catch basin.

There are as many pairs of blast nozzles and cyclones as the selecting unit 60 can differentiate types. Each type is allocated a blast nozzle and a cyclone. The selecting unit has already recognized which type of content material a specific fluorescent tube 3 contains. For this specific fluorescent tube 3 only the blast nozzle is put into action that is provided for the relevant type. In this manner the content material of the different fluorescent tubes is sorted.

The blown-out glass tubes 30 fall into a breaker 40, which is only indicated schematically and in which they can be comminuted into free-flowing small pieces, which fall through a channel 41 into a transport container 42, which is transported to the lamp manufacturer, where the glass material is remelted.

Figure 5:
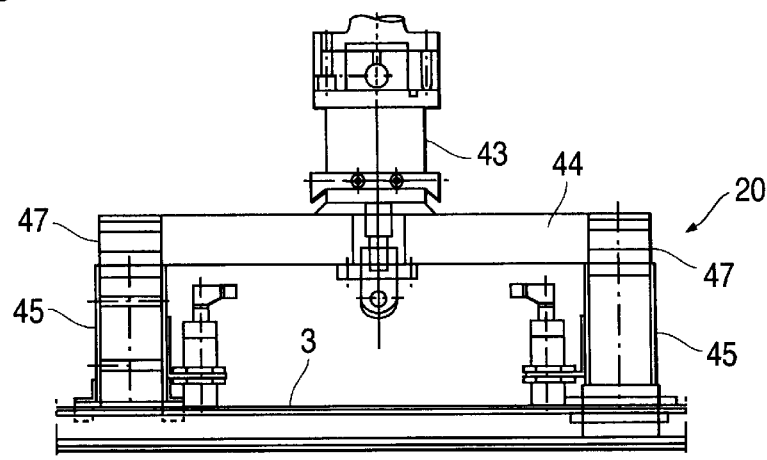
FIG. 5 is a view of the suction frame.
Figure 6:
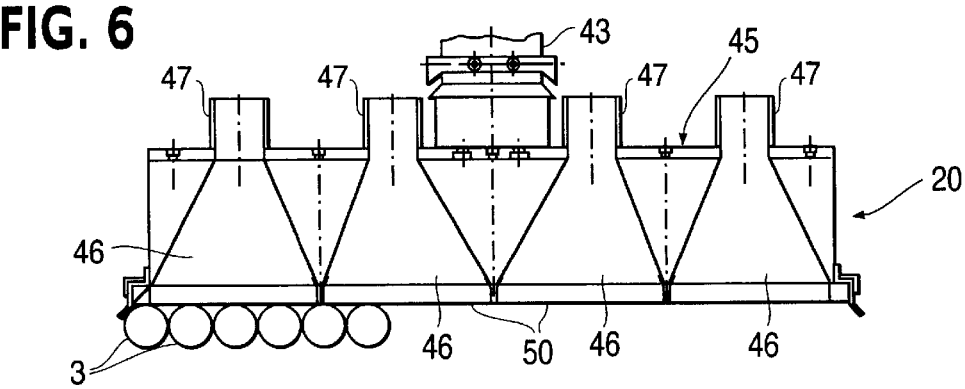
FIG. 6 is a view, according to FIG. 5, from the left.
Figure 7:
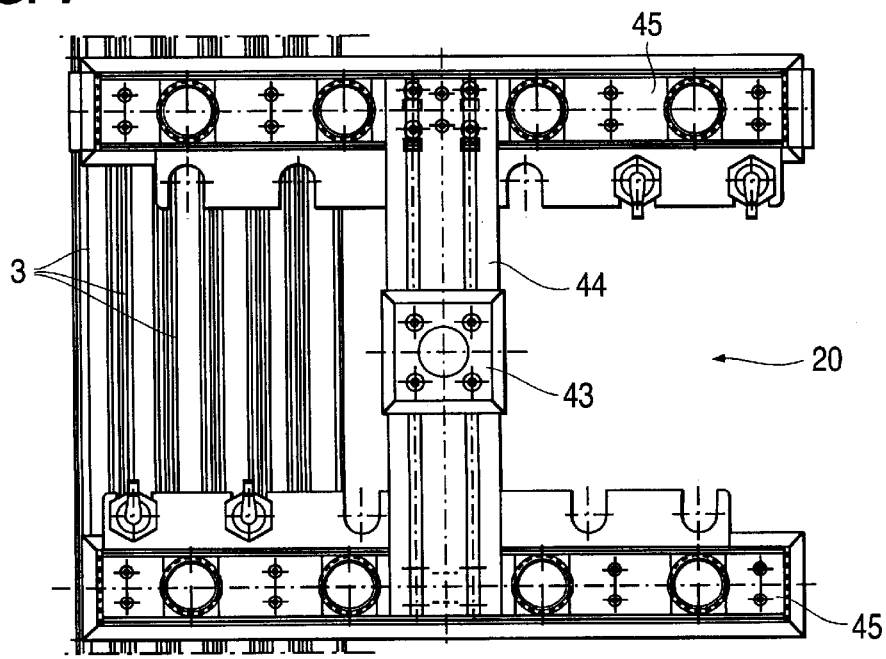
FIG. 7 is a top view, according to FIG. 6.

FIGS. 5 to 7 show the suction frame 20 in detail. It is suspended by means of a connecting link 43 to the boom 12, whose bottom end is fastened in the middle of the cross beam 44, whose both ends bear parallel suction beams 45, which extend at right angle to the cross beam 44. The suction beams 45 comprise in the embodiment four separate suction chambers 46, which are shaped like funnels and whose upper ends exhibit fittings 47 for the connection of the vacuum lines 48 (FIGS. 2).

The suction chambers 46 attach themselves with their flexible bottom edges 50, as evident from the figures, to the layer 7 of the fluorescent tubes by means of suction. The fluorescent tubes 3 are so light that they can be lifted from the pallet 6 by this method as shown in FIG. 2 and transferred to the delivery conveyor 13. To avoid unnecessary pressure losses, there can be a controller, which turns off the suction chamber 46 as soon as the mouth of the same is not or is inadequately covered. For this reason the individual suction chambers 46 have separate vacuum lines 48.

What is claimed is:

1. System for recycling for the purpose of re-utilizing the components of defective or spent fluorescent tubes, which are made of a straight glass tube, which exhibits a gas filling under low pressure, a coating of a fine luminescent powder applied on the inside circumference of the glass tube and whose two ends exhibit metal connecting bases, comprising a conveying device, on which the fluorescent tubes, which are arranged parallel to each other, adjacent to each other and perpendicular to the conveying device, can be conveyed past processing stations in a substantially horizontal manner, comprising a feed station, which precedes the conveying device in order to feed the delivered fluorescent tubes to the conveying device, comprising a perforating station, where a slit in the glass tube can be produced at least on one end of the fluorescent tubes for the purpose of relieving the negative pressure prevailing in the glass tube, comprising a severing station for severing the sealing and connecting caps from the glass tube of the respective fluorescent tube, comprising a blow-out station, where the phosphor is blown out of the respective glass tube by means of a blast of air along the length of said tube, and comprising a breaking station, where the glass tube can be comminuted into free-flowing fragments, characterized in that the conveying device can be driven continuously and that the perforating station has on at least one end and the severing station has on both ends of the respective fluorescent tubes burner strips with adjacent nozzle orifices, which are arranged close together in a row arranged in a straight line in the conveying direction and which melt the ends of the glass tube into the shape of a slit.

2. System, as claimed in claim 1, characterized in that the conveying device has two chain conveyors, which revolve continuously side-by-side in vertical planes and are spaced apart so as to match the length of the fluorescent tubes and whose upper runs carry the fluorescent tubes.

3. System, as claimed in claim 2, characterized in that the conveying device follows a transfer conveyor, onto which the fluorescent tubes can be transferred in an ordered manner and by means of which the fluorescent tubes can be delivered individually to the conveying device.

4. System, as claimed in claim 3, characterized in that the transfer conveyor comprises a conveyor, followed by a separating unit.

5. System, as claimed in claim 1, characterized in that the feed station comprises a grasping device, by means of which at least one portion of a layer of fluorescent tubes can be grasped at one time and put on the transfer conveyor.

6. System, as claimed in claim 5, characterized in that the grasping device comprise a suction member.

7. System, as claimed in claim 6, characterized in that the suction member comprises a suction frame, which is adapted to the layout of the layer or a portion of the layer of fluorescent tubes.

8. System, as claimed in claim 7, characterized in that the suction frame is suspended from a lifting device, which is provided with a boom that can be swung up or down and rotated around a vertical axis.

9. System, as claimed in claim 1, characterized in that the severing station comprises a burner strip, which extends in the conveying direction in the region of both ends of the fluorescent tube.

10. System, as claimed in claim 9, characterized in that a device for rotating the fluorescent tube around its axis while passing the burner strip is assigned to the burner strip.

11. System, as claimed in claim 10, characterized in that the device comprises a ramp on the inside next to each burner strip and on this ramp rest the fluorescent tubes, which are conveyed horizontally by the conveyor and rotate so as to roll around their axis as they are carried along.

12. System, as claimed in claim 10, characterized in that following the burner strips there is a device for producing a knife-like cool air jet for blasting off the ends of the fluorescent tubes.

13. System, as claimed in claim 1, characterized in that the burner strips exhibit an effective length ranging from 100 to 300 mm.

14. System, as claimed in claim 13, characterized in that the burner strips exhibit a longitudinal housing with thirty to eighty nozzle orifices, whose diameters range from 0.2 to 0.4 mm and which are provided, when in operation, on a side facing the fluorescent tubes.

15. System, as claimed in claim 1, characterized in that in the area of the burner strips there is a detector, by means of which fluorescent tubes, provided with metal strips that run parallel to their axis on the outside circumference, can be detected and can be excluded from further processing in the system by a separating unit, which interacts with the detector.

16. System, as claimed in claim 1, characterized in that in the area of the burner strips there is a detector, by means of which fluorescent tubes, provided with metal strips that run parallel to their axis on the outside circumference, can be detected and can be excluded from further processing in the system by a separating unit, which interacts with the detector.

17. System, as claimed in claim 16, characterized in that the blow-out station comprises several blast nozzles, which follow in succession in the conveying direction and which are assigned to a type and which interact with a catch basin for the blown-out material of the fluorescent tube.

18. System, as claimed in claim 17, characterized in that there is a controller, which is attached to the selecting unit and by means of which, when a specific fluorescent tube passes by, that blast nozzle can be activated that is assigned to the type of phosphor contained in the fluorescent tube.

* * * * *